United States Patent [19]

Provorse

[11] 3,996,415
[45] Dec. 7, 1976

[54] EASY TO INSTALL TELEPHONE SERVICE BRACKET

[76] Inventor: Clifford Provorse, 710 E. 10th St., Coffeyville, Kans. 67337

[22] Filed: July 3, 1975

[21] Appl. No.: 593,127

[52] U.S. Cl. .............................. 174/48; 248/205 R
[51] Int. Cl.$^2$ ......................................... H02G 3/22
[58] Field of Search ................. 174/48, 49, 67, 66, 174/58, 38; 52/220, 221; 220/319; 248/205 R, 216

[56] References Cited

UNITED STATES PATENTS

| | | | |
|---|---|---|---|
| 2,723,822 | 11/1955 | McGuire | 52/221 X |
| 2,733,036 | 1/1956 | Meletio | 52/221 X |
| 2,855,578 | 10/1958 | Hirsch | 174/66 UX |
| 3,025,432 | 3/1962 | Giegerich | 174/48 X |
| 3,524,477 | 8/1970 | Steger | 174/49 UX |
| 3,868,080 | 2/1975 | Olson | 248/205 R |
| 3,879,641 | 4/1975 | Byrd | 52/221 X |

*Primary Examiner*—Arthur T. Grimley
*Assistant Examiner*—David A. Tone
*Attorney, Agent, or Firm*—Shoemaker and Mattare, Ltd.

[57] ABSTRACT

A quick and easy to install bracket for telephone and television service and the like includes a plate having diverse fastener devices associated therewith for mounting of the bracket on an outer surface of any of a plurality of diverse wall structures, and in one form of the invention in particular, includes a wire-enclosing conduit extending rearwardly from the plate, such that the telephone or television service line may be installed during construction of a building, and the installer may support the plate and conduit at a standardized height above the surface of the ground, and a brick mason or the like may subsequently erect a masonry wall with the conduit being built into the wall, thus eliminating the necessity of drilling through the wall to gain access to the interior thereof. In another form of the invention, the conduit is eliminated and the plate is attached to an outer surface of a wood, metal or shingle wall and the like, and the telephone or television and the like service line is passed rearwardly through an opening in the plate and through an aligned opening in the wall to the interior of the building.

12 Claims, 8 Drawing Figures

EASY TO INSTALL TELEPHONE SERVICE BRACKET

BACKGROUND OF THE INVENTION

This invention relates to an improved apparatus and method for installing telephone service lines or television cables and the like in the home. With the present invention a unique bracket is provided having a plate with diverse fastener means associated therewith, whereby during construction of a building the plate may be supported on a wall of the building at a standardized height.

In one form of the invention in particular, a wire enclosing conduit extends rearwardly from the plate, such that during construction of the building the person installing the telephone service line or cables for cable T.V. can support the plate at a desired height from the surface of the ground, and a brick mason or the like may subsequently erect a brick wall or the like with the conduit enclosed in the wall, thus eliminating the necessity of drilling a hole through a completed brick wall to gain access to the interior of the wall. Accordingly, the time required to install telephone service lines or T.V. cables and the like is substantially reduced, thus cutting down the man hours spent installing such lines or cables, and consequently reducing the cost thereof. The invention in particular eliminates the need for drilling a hole in a house wall, whether the wall is brick or some other hard surface, such as wood or metal or shingles or the like.

In the prior art, brackets for installing telephone service lines, for example, are mounted on an outer surface of a side wall of a building by drilling holes in the wall of the building, whether the wall is wood, shingle, masonry or the like.

OBJECTS OF THE INVENTION

Accordingly, it is an object of this invention to provide a bracket for quickly and easily installing telephone service lines and the like in a home, wherein the bracket includes a plate which an installer may support at a standardized elevation on a wall of a building, and in particular, to such a plate having a wire enclosing conduit extending rearwardly therefrom, such that if a masonry wall is being built, the brick mason or the like simply erects the wall with the conduit enclosed therein, thus eliminating the need of subsequently drilling a hole in the wall to gain access to the interior thereof.

Another object of the invention is to provide a universal telephone service line installation bracket for mounting to various types of wall structures, wherein the bracket includes a plate having diverse fastener means associated therewith for quickly and easily fastening the plate to any of a plurality of diverse wall structures.

A still further object of the invention is to provide a method of installing a telephone service line in a building wherein a wire supporting plate is temporarily supported on a wall of the building at a desired elevation above the ground, and a masonry wall is subsequently erected, with a wire enclosing conduit associated with the plate being built into the wall to thus enable easy access to the interior of the wall when telephone service wires are subsequently installed.

BRIEF DESCRIPTION OF THE DRAWINGS

FIG. 1 is a fragmentary view in elevation, with a portion broken away, of the invention shown associated with a masonry wall of cinderblock and the like.

FIG. 6 is an exploded, perspective view of a modification of the bracket according to the invention, showing use thereof for installing T.V. cable and the like.

FIG. 7 is an enlarged, sectional view in elevation of the bracket of FIG. 6, with the bracket attached to a wood or shingle wall and the like.

DETAILED DESCRIPTION OF THE INVENTION

Figure 1:
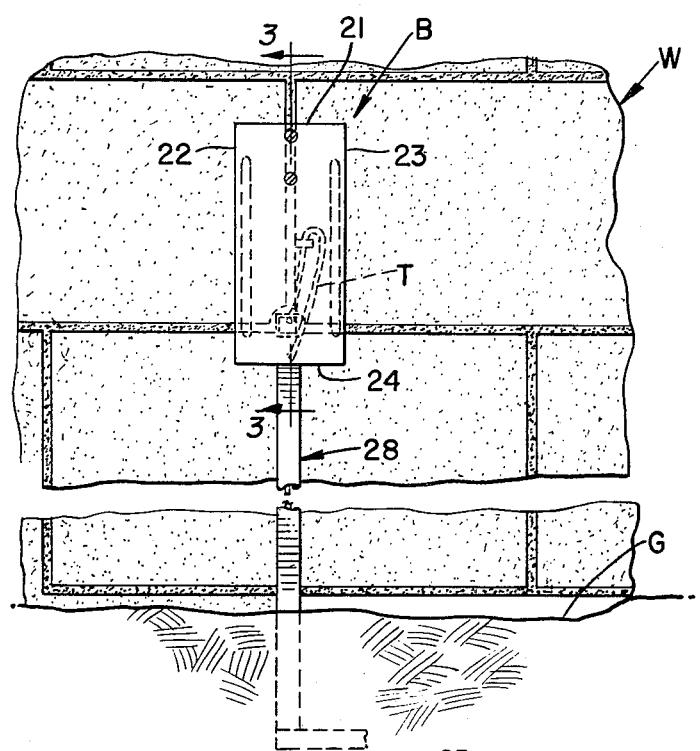
Figure 2:
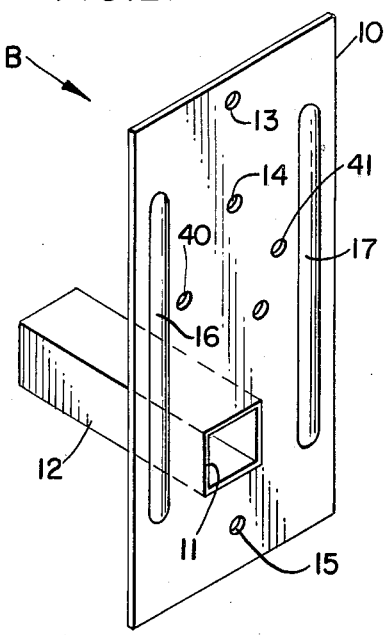
FIG. 2 is an enlarged, perspective view of the mounting plate and wire enclosing conduit of the bracket of the invention.
Figure 3:
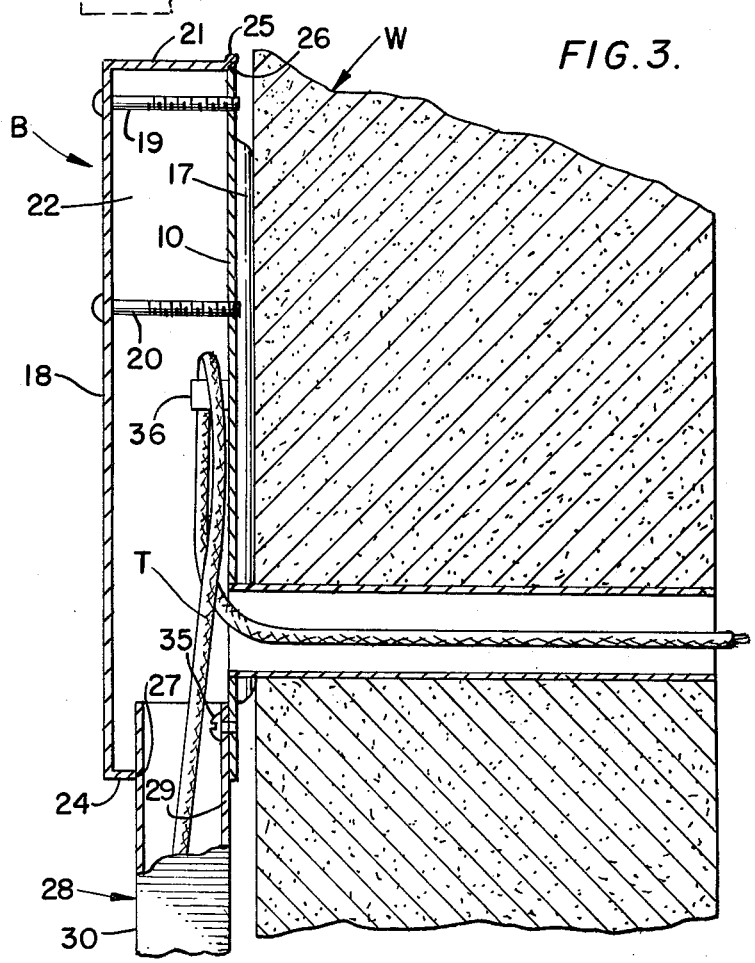
FIG. 3 is a greatly enlarged, vertical, sectional view taken along line 3—3 of FIG. 1, showing the manner in which the installation bracket is supported on a masonry wall.

In the drawings, wherein like reference numerals indicate like parts throughout the several views, a telephone service bracket B in accordance with the invention is shown installed on a masonry wall W in FIGS. 1–3. The bracket includes a substantially rectangularly shaped plate 10 of any suitable non-corrosive material, such as metal or plastic and the like, having a substantially rectangularly shaped opening 11 formed through a lower portion thereof, and in which an elongate wire enclosing conduit 12 of substantially rectangular or square cross-sectional configuration is snugly received and held. The conduit 12 is also formed of any suitable material which is non-corrosive, such as metal or plastic and the like.

A pair of tapped holes 13 and 14 are formed through the plate 1o in an upper portion thereof in spaced apart relationship, and a tapped hole 15 is formed through the plate in a lower portion thereof spaced below the rectangular opening 11 and conduit 12.

A pair of elongate, vertically extending indentations 16 and 17 are formed in the plate at opposite sides thereof and extend over a substantial portion of the length of the plate, such that when the plate is installed as in FIG. 3, the indentations 16 and 17, which form protrusions on the back surface of the plate, hold the body of the plate spaced from the outer surface of the wall W to enable moisture and debris and the like to fall free of the plate.

A cover 18 of a suitable material, such as metal or plastic and the like, is secured to the plate 10 by means of a pair of bolts or screws or the like 19 and 20 extended through the front of the cover 18 and into the tapped holes 13 and 14 in the plate 10. The cover 18 includes a top wall 21, opposite side walls 22 and 23, and a bottom wall 24.

The top and side walls include an outwardly flared flange 25 thereon which define a shoulder 26, which engages against a peripheral edge portion of plate 10 to hold the cover in the relationship as seen in FIG. 3 when the screws or bolts and the like 19 and 20 are tightened.

Further, the bottom wall 24 has a substantially rectangularly shaped notch or opening 27 therein which is received a telephone wire protector 28 comprising a pair of elongate, substantially channel-shaped members 29 and 30 having cooperating detent means 31 and 32 in the side walls or flanges thereof, whereby the channel members 29 and 30 may be snapped together to enclose a telephone wire T therein and form the protector 28.

Figure 4:
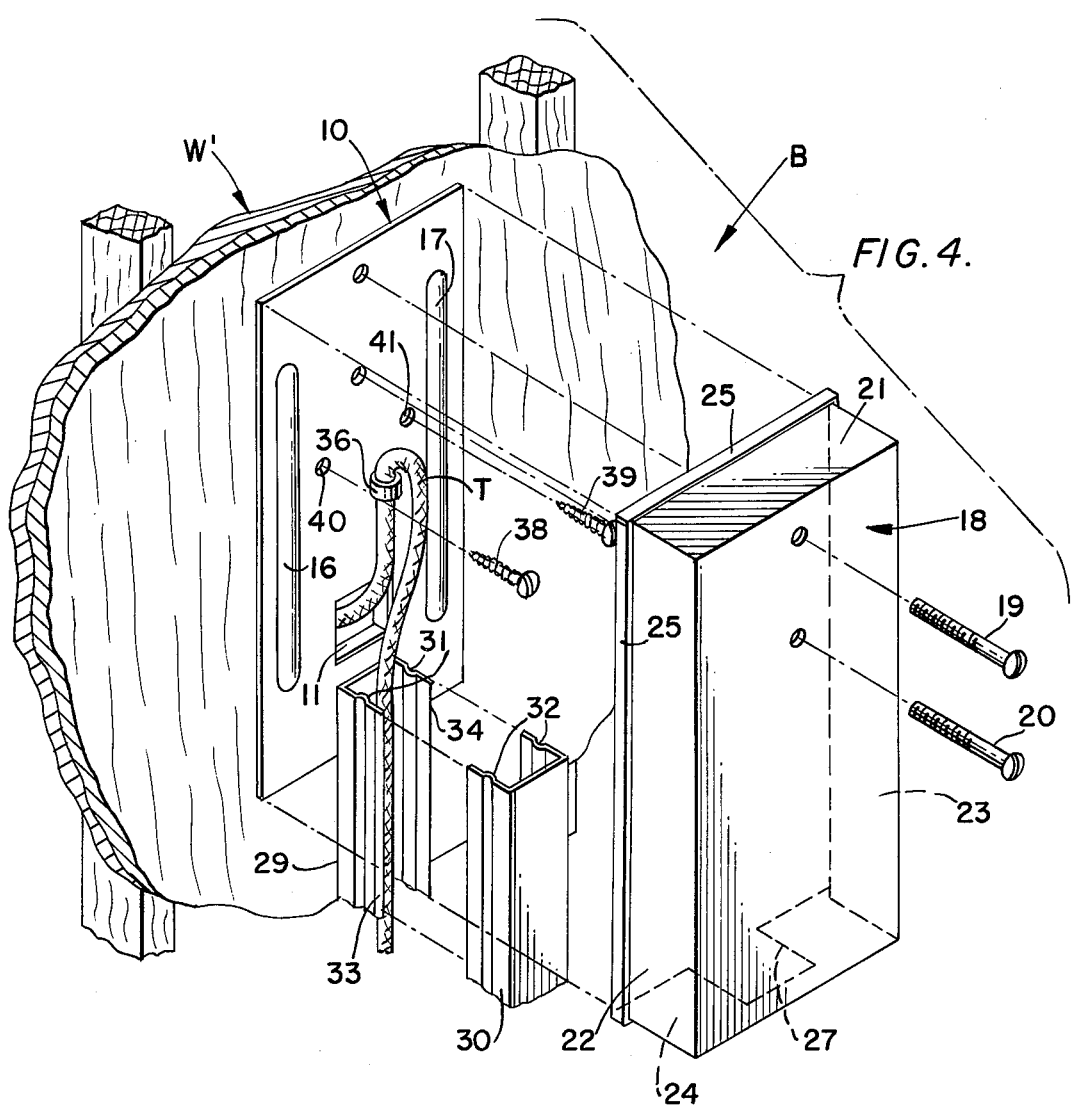
FIG. 4 is an enlarged, fragmentary, exploded, perspective view of a second form of the invention, wherein the bracket is attached to a wood wall.

As seen best in FIG. 4, the channel member 29 has tapered forward edges 33 and 34 on the side walls thereof to facilitate snapping together of the channel members 29 and 30. The rear channel member 29 is secured to the plate 10 by means of a screw or bolt or the like 35 extended through the web or rear wall of channel 29 and into the opening 15 at the lower portion of plate 10. The channel members 29 and 30 are preferably appoximately ¾ of an inch wide and 4 feet long, and are formed of a suitable noncorrosive material, such as plastic or metal and the like, and extend at their lower ends 6 to 12 inches below the ground, giving the wire protector strength and stability.

A suitable wire clamp 36 may also be secured to plate 10 in any suitable manner, such as by means of a screw or bolt or the like, to hold the wire T as indicated in FIGS. 3 and 4.

Figure 5:
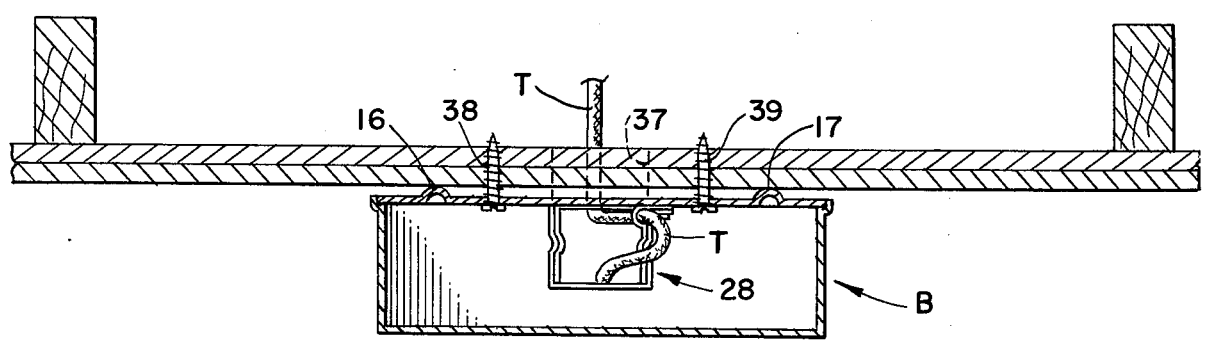
FIG. 5 is a horizontal view in section of the form of the invention in FIG. 4, shown installed on a wood or shingle and the like wall.

In FIGS. 4 and 5 the bracket B is shown attached to a wall W' of wood or shingle and the like, and in this form of the invention, the conduit 12 is eliminated and a hole 37 is simply formed through the wall W' in alignment with the hole 11 through the plate 10. The wire T is then fed upwardly from the protector 28 through the clamp 36 and through the holes 11 and 37 to the interior of the wall. Also, in this form of the invention, a pair of suitable fasteners, such as screws or the like 38 and 39 are extended through a pair of holes 40 and 41 formed through the plate at opposite sides thereof and into the wall W' to secure the plate and bracket in position.

In one specific construction of the invention, the plate 10 is approximately 3 inches by 7 inches and the conduit 12 is approximately ¾ inch by ¾ inch by 4½ inches. The channel members 29 and 30 are approximately ¾ inch wide by 48 inches long, and the bracket is preferably installed approximately 36 inches above the surface of the ground G. The channel 29 of bracket 28 is assembled to the plate 10 by means of a 3/16 inch bolt or screw of the like, and the protrusions 16 and 17 project rearwardly from the rear surface of plate 10 approximately 3/8 of an inch.

Figure 6:
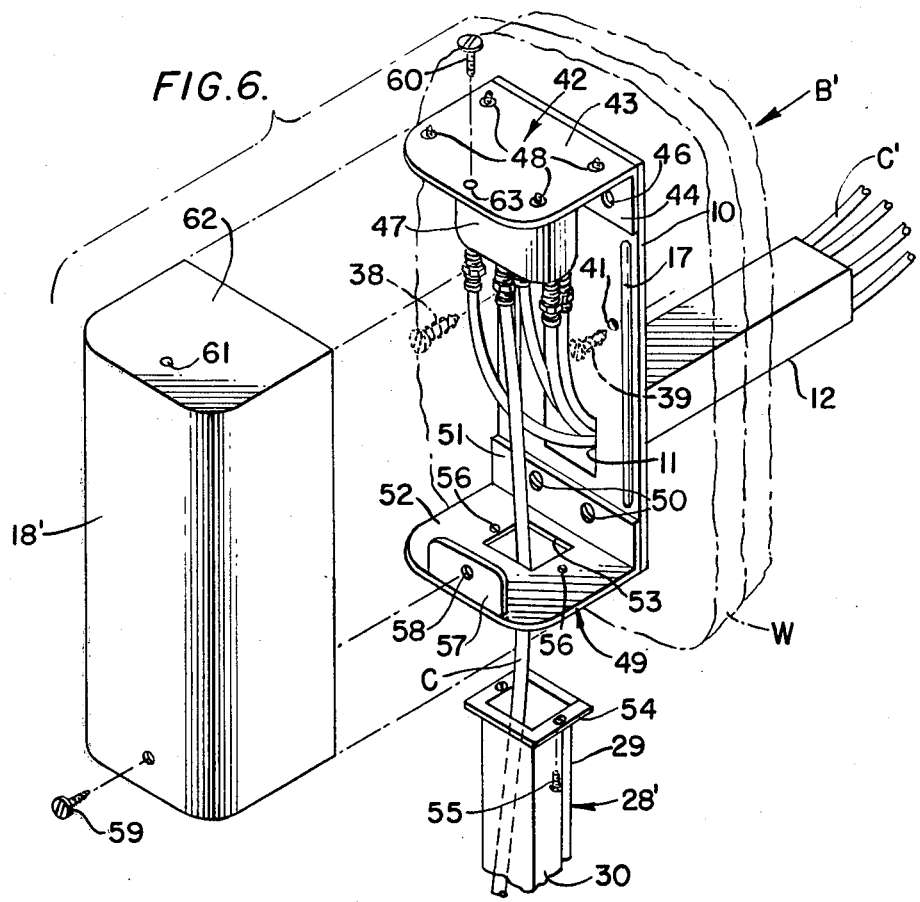
Figure 7:
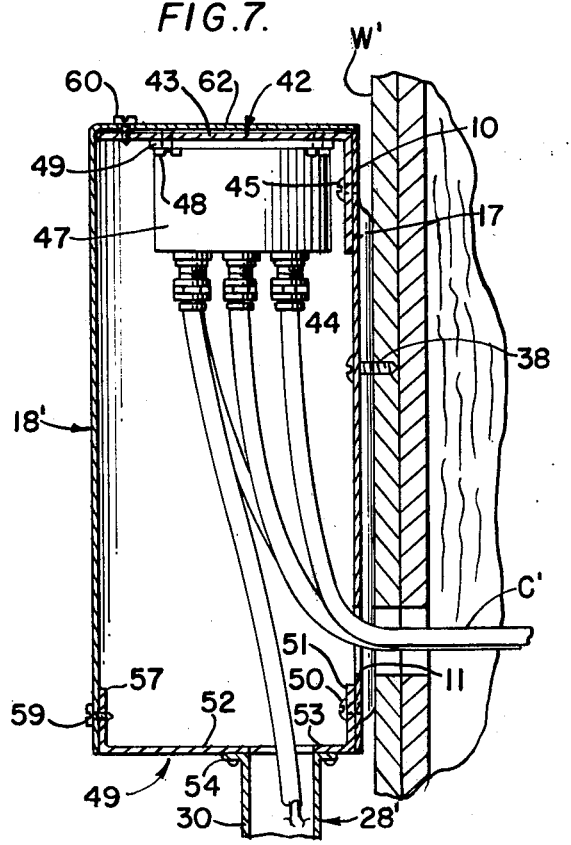

In FIG. 6, a modified bracket B' is shown associated with a masonry wall W, and includes the plate 10 having elongate indentations 17 therein and an opening 11 therethrough, with a tubular member or conduit 12 received therein and extending rearwardly therefrom. The plate also has spaced holes 40 and 41 therethrough for receiving screws 38 and 39 or other suitable fasteners therethrough when the bracket is used on a wood or shingle wall W', as in FIGS. 4 and 5. However, in this form of the invention, the bracket B' is used for installing T.V. cable and the like, and rather than the clip 36 for holding telephone wire and the like, an upper L-shaped mounting bracket 42, comprising a horizontally extending plate 43 and a vertically extending plate 44 is attached to plate 10 by means of screws or the like 45 and 46 extended through plate 44 and into plate 10. A four-way T.V. cable splitter 47 is secured to plate 43 by means of screws 48 extended through a flange 49 on the splitter and into the plate 43. A similar L-shaped mounting bracket 49 is suitably attached to plate 10 at the lower end thereof by means of screws 50 extended through a vertical flange or plate 51 of the mounting bracket 49. A horizontal flange or plate 52 extends outwardly from the bottom edge of flange 51, and has an opening 53 therethrough for receiving T.V. cable C. The cable C is enclosed in a tubular conduit 28', comprising snapped together channel members 29 and 30, as before. The conduit 28' has a flange 54 on the upper end thereof through which screws 55 are extended into holes 56 in flange 52, to secure the conduit 28' in position. An upstanding lip or flange 57 is suitably formed on the front edge of flange 52, and has a hole 58 therethrough, for a purpose later described.

A cover 18' is secured to the plate 10 by means of a screw or the like 59 extended through the front wall of the cover adjacent the lower end thereof and into the opening 58 in lip 57, and a screw 60 extended downwardly through an opening 61 in top wall 62 of the cover and into an opening 63 in plate 43 of mounting bracket 42.

Figure 8:
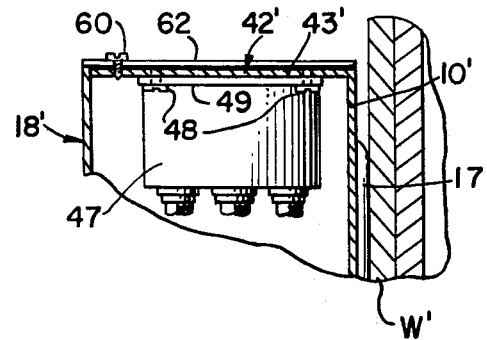
FIG. 8 is an enlarged, fragmentary view in elevation of a modification of the bracket of FIG. 7.

In FIG. 8, a modified plate 10' has the upper mounting bracket 42' formed integrally therewith, as a horizontally extending upper end portion 43' of the plate 10'.

Thus, a universal mounting bracket is provided, which is quickly and easily secured to diverse wall constructions, and which can be equally as well used for telephone or television or other similar service.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An easy to install bracket for telephone and television service and the like, comprising a substantially rectangularly shaped plate having a wire-receiving opening therethrough and a front surface and a back surface, means extending rearwardly from the plate and into a wall of a building securing the plate to the wall in upwardly spaced relation from the ground, a cover secured to the plate over the front surface thereof, said cover including a top wall, a front wall and opposite side walls, and a tubular wire protector extending upwardly from the ground to adjacent a bottom edge of the cover to enclose and protect a service wire leading from the ground to the bracket, said tubular protector comprising a pair of elongate channel members having interengageable detent means thereon for snap-fitting engagement to releasably snap the channel members together to form the tubular protector.

2. A bracket as in claim 1, wherein the means securing the plate to the wall comprises a plurality of threaded fasteners extended through openings in the plate and into the wall.

3. A bracket as in claim 1, wherein a plurality of spaced apart protrusions are on the back surface of the plate engaged with the wall to hold the plate spaced from the wall and thus enable dirt and moisture and the like to fall free of the space between the plate and wall.

4. A bracket as in claim 1, wherein said cover includes a bottom wall having an opening therethrough, said tubular wire protector extending upwardly through said opening.

5. A bracket as in claim 1, wherein an L-shaped mounting bracket is secured to a lower edge portion of the plate, said L-shaped bracket including a vertically extending flange secured to the plate and a horizontally extending flange extending outwardly from the lower end of the plate, said horizontally extending flange having an opening therethrough, and said tubular wire protector extending upwardly through said opening.

6. A bracket as in claim 5, wherein a second L-shaped bracket is secured to an upper end portion of the plate and includes a horizontally extending flange projecting outwardly from the upper end of the plate, and a four-way T.V. signal splitter secured to said horizontally extending flange of the second L-shaped bracket.

7. An easy to install bracket for telephone and television service and the like, comprising a substantially rectangularly shaped plate having a wire-receiving opening therethrough and a front surface and a back surface, said plate being located on a wall outside of a building and spaced apart therefrom, means extending rearwardly from the plate and through the wall of the building securing the plate to the wall in upwardly spaced relation from the ground, said means comprising a tubular wire-receiving conduit secured to the plate in registry with the openings and extended through said wall, said wall comprising a masonry wall and said conduit imbedded in said wall during construction of the wall.

8. A bracket as in claim 7, wherein a plurality of spaced apart protrusions are on the back surface of the plate engaged with the wall to hold the plate in the spaced apart relationship with the wall and thus enable dirt and moisture and the like to fall free of the space between the plate and wall.

9. An easy to install bracket for telephone and television service and the like, comprising a substantially rectangularly shaped plate having a wire-receiving opening therethrough and a front surface and a back surface, means extending rearwardly from the plate and through a wall of a building securing the plate to the wall in upwardly spaced relation from the ground, said means comprising a tubular wire-receiving conduit secured to the plate in registry with the opening and extended through said wall, said wall comprising a masonry wall and said conduit imbedded in said wall during construction of the wall, a cover secured to the plate over the front surface thereof, said cover including a top wall, opposite side walls and a bottom wall, said bottom wall having an opening therethrough, and a tubular wire protector extending upwardly from the ground and through the opening in the cover bottom wall to enclose and protect a telephone service wire leading from the ground to the bracket, said tubular protector comprising a pair of elongate channel members having interengageable detent means thereon for snap-fitting engagement to releasably snap the channel members together to form the tubular protector.

10. A bracket as in claim 9, wherein the upper end of the tubular protector is secured to said plate, said plate, cover, tubular conduit and tubular protector all comprising a corrosion resistant material.

11. A method of installing and supporting a bracket for telephone and television service installation and the like to a wall, wherein the bracket includes a support plate, a cover and a wire-enclosing conduit extending rearwardly from the plate, comprising the steps of temporarily supporting the plate on a wall of a building under construction at a predetermined height above the ground, subsequently erecting a masonry wall and embedding the wire enclosing conduit in the wall thus permanently securing the plate to the wall and affording communication from outside to the inner surface of the wall without requiring drilling and the like, and thereafter placing a telephone wire for telephone or television and the like service through the conduit and securing the cover over the plate.

12. The method as defined in claim 11, including the step of snap-fitting together a pair of wire-enclosing channel members thus forming a wire protector for a service wire leading from the ground to the bracket and thence through the wall.

* * * * *